US006920432B1

(12) United States Patent
Carey

(10) Patent No.: US 6,920,432 B1
(45) Date of Patent: Jul. 19, 2005

(54) TECHNIQUES OF SELECTING SECURITIES FOR A PORTFOLIO USING BUYBACK RATIO AND DIVIDEND YIELD

(75) Inventor: Robert Franklin Carey, Naperville, IL (US)

(73) Assignee: Nike Securities, L.P., Lisle, IL (US)

( * ) Notice: Subject to any disclaimer, the term of this patent is extended or adjusted under 35 U.S.C. 154(b) by 491 days.

(21) Appl. No.: 09/639,478

(22) Filed: Aug. 15, 2000

(51) Int. Cl.$^7$ .............................................. G06F 17/60
(52) U.S. Cl. ...................................................... 705/36
(58) Field of Search ........................................... 705/36

(56) References Cited

U.S. PATENT DOCUMENTS

| | | | | | |
|---|---|---|---|---|---|
| 5,132,899 | A | * | 7/1992 | Fox .............................. | 705/36 |
| 5,335,277 | A | * | 8/1994 | Harvey et al. .............. | 380/242 |
| 5,761,442 | A | * | 6/1998 | Barr et al. .................... | 705/36 |
| 5,784,696 | A | * | 7/1998 | Melnikoff ..................... | 705/36 |
| 5,819,238 | A | * | 10/1998 | Fernholz ....................... | 705/36 |
| 5,884,287 | A | * | 3/1999 | Edesess ........................ | 705/36 |
| 5,930,774 | A | * | 7/1999 | Chennault ..................... | 705/36 |
| 5,978,778 | A | * | 11/1999 | O'Shaughnessy ............ | 705/36 |
| 6,035,286 | A | * | 3/2000 | Fried ............................ | 705/36 |
| 6,161,099 | A | | 12/2000 | Harrington et al. ........... | 705/37 |
| 6,839,685 | B1 | * | 1/2005 | Leistensnider et al. ....... | 705/36 |
| 2003/0105672 | A1 | * | 6/2003 | Epstein et al. ................ | 705/26 |

FOREIGN PATENT DOCUMENTS

WO    WO-00/33212 A1 *  6/2000

OTHER PUBLICATIONS

Dunagan, P., et al. "Investing for Dividend Growth," Black Enterprise, vol. 23, No. 10, pp. 37–42, May 1993.*
Hardy, E.S., "Get with Value," Forbes, vol. 155, No. 3, pp. 63–66, Jan. 30, 1995.*
Downes, J., Editor, Dictionary of Finance and Investment Terms, 5$^{th}$ Edition, Barron's Educational Series, Hauppage, New Yor 1998, pp. 452–454, and 550–551.*
Anon., "Polaris Securities Permitted to Trade in Japanese Stocks for Flients," Taiwan Economic News, Aug. 2, 1999.*
Longo, T., "Advisers vs. Brokers: What's in a Name?," On Wall Street, Sep. 1, 1999.*
Anon., "TD Waterhouse to Bring Net Broking to India vs. JV with Tata Securities," Economic Times, Dec. 14, 1999.*
Wadhwani, S.B., "The US Stock Market and the Global Economic Crisis," National Institute Economic Review, No. 167, pp. 86 105, Jan. 1999.*
Wiles, R., "Public Watches Dow, but Invests in S&P," Arizona Republic, Final Chaser edition, p. D1, Sunday, Mar. 21, 199.*
Gallagher, K., "Milwaukee Investing Club, down 42.4 Percent, Meets to Decide New Strategy," Knight–Ridder tribune Business News, May 8, 2000.*
Hoffman, D., "Market Conditions Are Indicating ... the Best Oportunities Will Still Be in New Economy Areas," Investment News, vol. 4, No. 25, p. 50, Jun. 26, 2000.*
Liscio, J., "Splitting Shares: Using the Americus Trusts to Boost Blue–chip Returns," (Abstract only) Barron's, vol. 68, No. 11, p 13, 72–73, Mar. 14, 1988.*

(Continued)

Primary Examiner—Nicholas D. Rosen
(74) Attorney, Agent, or Firm—McAndrews, Held & Malloy, Ltd.

(57) ABSTRACT

A technique is provided for selecting a portfolio of securities for investment purposes. Specifically, the technique utilizes two types of securities-related data: dividend yields and buyback ratios. A group of securities is ranked by the sum of each security's dividend yield and buyback ratio; a number of the securities having the highest combined dividend yields and buyback ratios are selected for investment. The technique may include a computer for storing the buyback ratios and dividend yields.

18 Claims, 2 Drawing Sheets

OTHER PUBLICATIONS

Anon., "PaineWebber Readies Unit Trust That Invests in Possible Takeover Targets," Securities Week, p. 9, Nov. 14, 1988.*

Roush, M., "FoM Joins New Investment Trust," Crain's Detroit Business, vol. 11, No. 11, p. 28, Mar. 13, 1995.*

Lunenberg, S., "The Best Stock–Picking Strategy Yet?" (Abstract only), Medical Economics, vol. 74, No. 4, pp. 46–61, Feb. 24, 1997.*

Brown, J., "Tax Changes May Dog 'Beating the Dow' Strategy," San Jose Mercury News, Wednesday, Morning Final Edition, p. 4G, Sep. 3, 1997.*

Anon., "Dow Dogs Will Have Their Day, Fans Say Critics Call Strategy Overused, Outdated Dogs of 1997 Lost Their Bite," St, Louis Post–Dispatch, Five Star Lift edition, p. C5, Friday, Jan. 9, 1998.*

Anon., "Van Kampen Sells 'Dow Dog' Annuity," Bank Mutual Fund, Feb. 16, 1998, vol. 6, No. 7, p. 1.*

Liberman, G., "Fund Group Unveils Index–Linked Unit Investment Trusts," Mutual Fund Market News, vol. VI, No. 30, p. 2, Aug. 3, 1998.*

* cited by examiner

US 6,920,432 B1

TECHNIQUES OF SELECTING SECURITIES FOR A PORTFOLIO USING BUYBACK RATIO AND DIVIDEND YIELD

BACKGROUND OF THE INVENTION

The present invention generally relates to techniques for selecting a securities portfolio for investment. More particularly, the present invention relates to an investment strategy for selecting a securities portfolio based upon two criteria: dividend yields and buyback ratios. One investment objective of the present invention is to provide an above-average total return from the portfolio through investing in stocks with high dividend yields and high buyback ratios.

A unit investment trust (UIT) is a professionally selected, diversified portfolio of stocks, bonds, or other securities that remains as a fixed portfolio throughout the life of the trust. Investors in a UIT purchase units, which represent an undivided ownership in the entire portfolio. Unlike mutual funds, in which the portfolio is actively managed and traded and continuously changes, UITs generally remain fixed for a predetermined period of time. Portfolios are designed to fill a variety of investment needs and risk tolerance levels. They fall into primarily two categories, equity and fixed income.

Equity portfolios are typically classified as either strategy portfolios or sector portfolios. Strategy portfolios follow predetermined investment criteria for selecting the stocks for the portfolio. All strategies have three inherent qualities:

1. Simplicity: The strategies seek to out-perform specified indices by selecting portfolios using sound, fundamental screens that reflect the historical behavior of the securities.

2. Resilience: The strategies must show back-tested results and have staying power even through bear markets.

3. Discipline: The strategies dictate which stocks are chosen for the portfolio; no emotional judgments are made and the strategies always remain the same.

Heretofore, investment strategies have been illustrated in U.S. Pat. No. 5,978,778 issued to O'Shaughnessy on Nov. 2, 1999 and U.S. Pat. No. 5,132,899 issued to Fox on Jul. 21, 1992. However, these investment strategies are not the same as the method of the present invention.

SUMMARY OF THE INVENTION

A first embodiment of the invention is useful for selecting securities from a group of available securities for an investment portfolio. In such an environment, the first embodiment comprises collecting the dividend yields and buyback ratios of the group of available securities. At least some of the available securities are ranked according to predetermined criteria comprising a predetermined relationship between the collected dividend yields and the collected buyback ratios to form a group of ranked securities. At least some of the ranked securities are selected to form a group of selected securities.

A second embodiment of the invention is useful for selecting securities from a group of available securities having dividend yields and buyback ratios for an investment portfolio. The second embodiment comprises a memory storing the dividend yields and buyback ratios of the group of available securities. A processor is programmed to rank at least some of the available securities according to predetermined criteria comprising a predetermined relationship between the collected dividend yields and the collected buyback ratios to generate a group of ranked securities. An output unit indicates in human readable form at least the ranked securities.

By using the foregoing techniques, dividend yields and buyback ratios may be used in an investment strategy attempting to obtain above-average total returns. These and other features of the present invention are discussed or are apparent in the following detailed description of the preferred embodiments of the invention.

DETAILED DESCRIPTION OF THE PREFERRED EMBODIMENTS

The security selection techniques disclosed in this specification may be used in an investment strategy which seeks to outperform a typical index by adhering to a disciplined investment process. The first step in this strategy is defining the universe of securities for potential investment. In one embodiment of the present invention, the technique begins with using a database of stocks of companies listed in the Dow Jones Industrial Average ("DJIA"), which consists of 30 U.S. stocks chosen by the editors of *The Wall Street Journal* as being representative of the broad market and of American industry. However, the present invention is not intended to be limited to just the DJIA, or even to stocks; any type of security meeting the selection criteria may be utilized. Moreover, the present invention is not limited to any particular database of securities; any group of securities, including one developed by the user of the present technique, could be substituted for the DJIA.

The present techniques enable selection of securities from the group of securities based upon criteria including dividend yields and buyback ratios. By looking at dividend yields, the preferred embodiment seeks to uncover stocks that may be out of favor or undervalued. Regular dividends are common for established companies and have typically accounted for a large portion of the total return on stocks. Historically, companies rewarded shareholders in the form of dividend payments.

The preferred embodiment also looks at buyback ratios. More recently, many companies have turned to stock reduction programs as a tax efficient way to bolster their stock prices and reward shareholders. Companies which have reduced their shares through a share buyback program may provide a strong cash flow position and, in turn, high quality earnings. Buyback ratio is determined by subtracting one from the ratio of a company's shares of common stock outstanding 12 months prior to the initial date of deposit divided by a company's shares of common stock outstanding as of the business day prior to the initial date of deposit.

Figure 1:
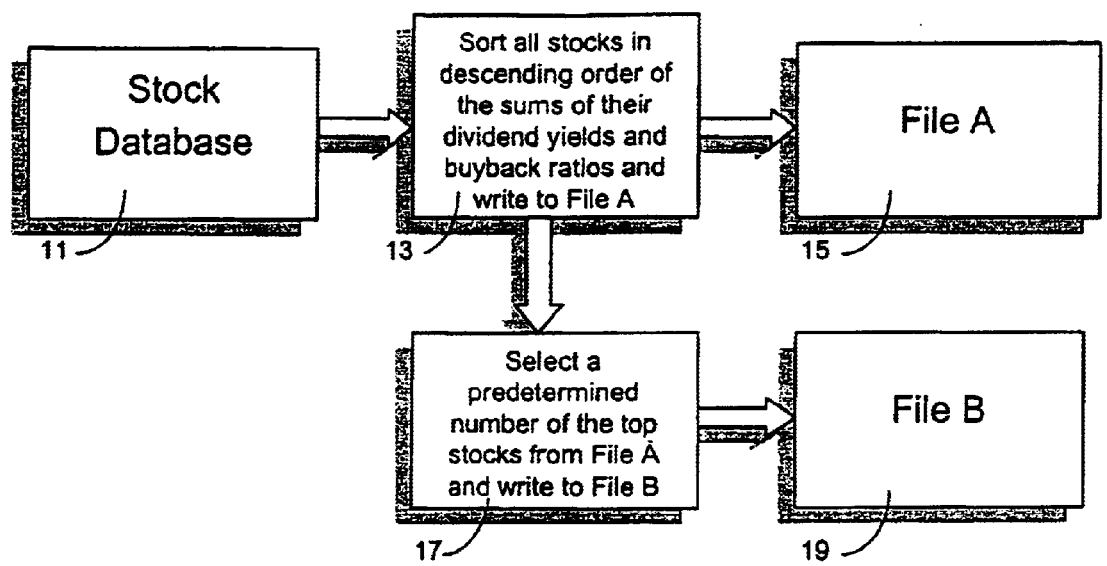
FIG. 1 is a schematic flow chart depicting the steps in an exemplary method of selection of securities.
Figure 2:
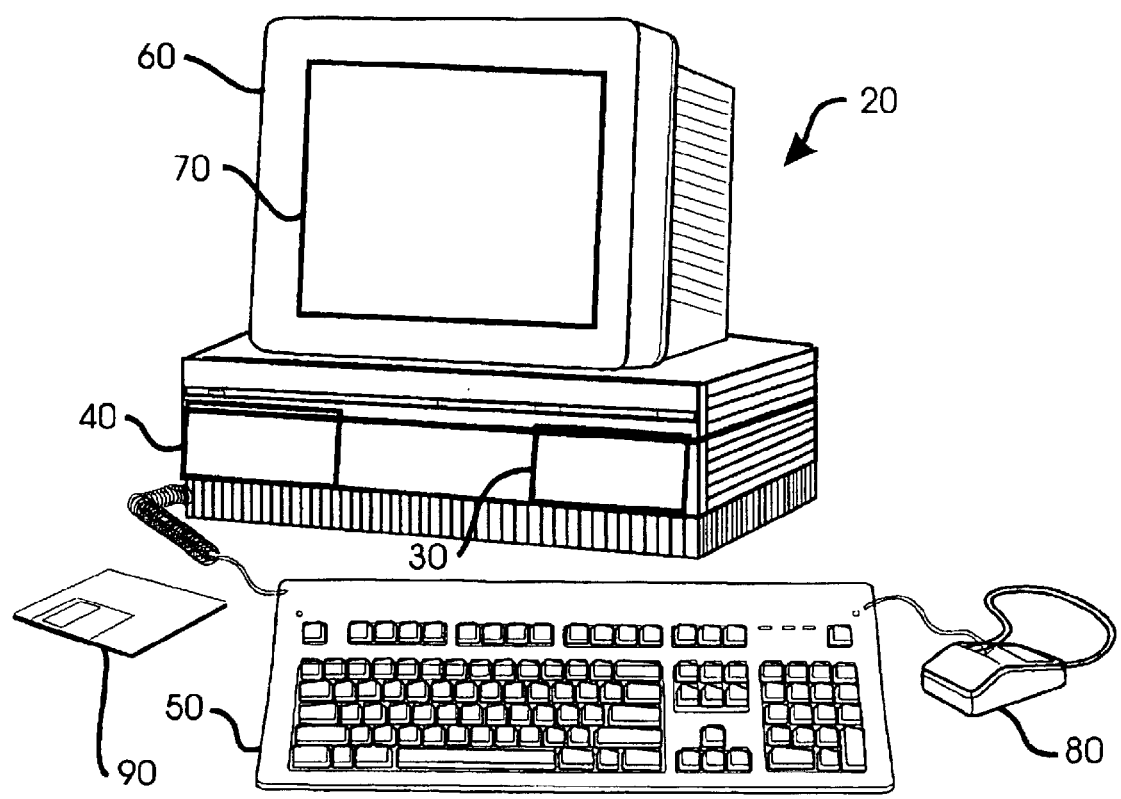
FIG. 2 is a schematic block diagram of a computer system embodying one form of the invention.

Referring to FIG. 1, a stock database 11 is formed by collecting data using, for example, a keyboard 50 of a conventional personal computer 20 (FIG. 2). The data collection includes the names of, or a representation of, the thirty (30) stocks that make up the DJIA. The names of the 30 stocks, or their symbols or other representative indicia, are included in the database 11 (FIG. 1) which is stored in a conventional computer memory 30 (FIG. 2).

In addition to the identity of the 30 stocks, other data related to each stock may also be stored in the database 11 and memory 30 in association with its respective stock name. Such information may include (1) dividend yield and (2) buyback ratio.

In the step indicated by the diagram block 13 (FIG. 1), the stocks in the database 11 are ranked by any conventional means, such as by sorting or organizing, according to the magnitude of the sum of each stock's dividend yield and buyback ratio. The sorting may be done by organizing the stocks in descending order of these sums. The ranked stock names are written to File A, as shown in the diagram block 15. The ranking is executed by a processor 40 of computer system 20. Processor 40 may be a microprocessor, microcontroller or any integrated circuit capable of logical and arithmetic operations.

In addition to buyback ratio and dividend yield, various criteria may be used to rank the stocks, such as capitalization. However, in the preferred embodiment, only the dividend yield and buyback ratio for each stock are used for ranking. That information may be initially stored in database 11 and memory 30.

The results of the ranking are sent to a conventional output device, such as display monitor 60 having a display face 70. Alternatively, the results may be printed by a printer (not shown). The input and display process may be aided by a conventional computer mouse 80.

After File A has been completed, the step indicated by diagram block 17 is performed in which a desired number (for example, 10) of stocks from File A with the highest combined dividend yields and buyback ratios are selected. This part of the process may or may not be performed by computer system 20. Since the stocks are sorted in File A in descending order of the sum of each stock's dividend yield and buyback ratio, this selection is performed by identifying the first 10 stocks in the ordered list. As will suggest itself, other modes of selection may be used.

The identities of those 10 stocks are stored in File B as shown at diagram block 19. As understood, File B may be a file different from File A, or non-selected stocks in File A may be deleted to form File B. File B also may be stored in memory 30.

A computer program capable of executing the steps described in connection with FIG. 1 may be stored in memory 30 and on a conventional computer readable medium, such as a floppy disk 90 (FIG. 2) or a CD-ROM. Files A and B also may be stored on such medium.

In an exemplary embodiment, a portfolio of the top 10 stocks of File B will represent one series of a unit investment trust. With the deposit of the selected shares of stock, a percentage relationship among the securities in the trust's portfolio is established. In an exemplary embodiment, the percentages of stock holdings in the portfolio will be approximately equal on the initial date of deposit. Since the prices of the selected securities will fluctuate daily, the ratio of securities in the trust, on a market value basis, will also change daily.

The trust will terminate on a mandatory termination date, which will typically be approximately 13 months from the initial date of deposit. Twelve-month termination dates are also contemplated. However, the duration of the investment vehicle is not limited to any particular length of time.

Some possible features and benefits of such a unit investment trust or other pooled vehicle or investment account include (although these are not essential features of the present invention): immediate liquidity, in-kind distribution, low expenses, a dividend reinvestment option, and an exchange option. The present techniques allow a purchaser to acquire a quality portfolio of attractive common stocks in one convenient purchase.

The present invention is not limited to the selection of securities for funding a unit investment trust. Securities may be selected for funding any type of pooled investment vehicle or investment account. The present invention could also be used in connection with variable annuities, open-ended mutual funds, etc.

Price volatility is a potential risk factor relevant to a unit investment trust selected pursuant to the present method. Since the trust invests in common stocks of U.S. companies, the value of the trust's units will fluctuate with changes in the value of these common stocks. Common stock prices fluctuate for several reasons, including changes in investors' perceptions of the financial condition of an issuer or the general condition of the relevant stock market, or when political or economic events affecting the issuers occur. Because the trust would not be managed, stocks would not be sold in response to or in anticipation of market fluctuations, as is common in managed investments. The present techniques may use dividend yield as part of its selection criteria, which is a contrarian strategy in which the securities selected share qualities that have caused them to have lower share prices or higher dividend yields than other common stocks in their peer group.

The use of dividends also presents a risk to an investor. There is no guarantee that the issuers of the securities will declare dividends in the future or that if declared they will either remain at current levels or increase over time.

From time to time, various legislative initiatives are proposed in the United States and abroad which may have a negative impact on certain of the companies represented in the trust. In addition, litigation regarding any of the issuers of the securities or of the industries represented by these issuers, may negatively impact the share prices of these securities. The impact of any pending or threatened litigation on the share prices of the securities cannot be predicted.

In an exemplary embodiment, the following Table would illustrate one possible portfolio:

TABLE

| Number of Shares | Issuer of Security | % of Aggregate Offering Price | Market Value per Share ($) | Cost of Securities to Trust ($) | Current Dividend Yield (%) |
|---|---|---|---|---|---|
| 245 | AlliedSignal Inc. | 10 | 60.500 | 14.823 | 1.12 |
| 359 | The Boeing Company | 10 | 41.313 | 14.831 | 1.36 |
| 270 | Caterpillar Inc. | 10 | 55.000 | 14.850 | 2.36 |
| 224 | Eastman Kodak Company | 10 | 66.438 | 14.882 | 2.65 |
| 191 | Exxon Corporation | 10 | 77.875 | 14.874 | 2.26 |

TABLE-continued

| Number of Shares | Issuer of Security | % of Aggregate Offering Price | Market Value per Share ($) | Cost of Securities to Trust ($) | Current Dividend Yield (%) |
| --- | --- | --- | --- | --- | --- |
| 208 | General Motors Corporation | 10 | 71.250 | 14.820 | 2.81 |
| 155 | International Business Machines Corporation | 10 | 95.875 | 14.861 | 0.50 |
| 196 | Merck & Co., Inc. | 10 | 75.938 | 14.884 | 1.53 |
| 107 | J. P. Morgan & Company, Inc. | 10 | 139.313 | 14.906 | 2.84 |
| 591 | Philip Morris Companies, Inc. | 10 | 25.125 | 14.849 | 7.64 |

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A method utilizing a computer for selecting securities from a group of available securities for an investment portfolio comprising:

collecting the dividend yields and buyback ratios of said group of available securities;

ranking at least some of the available securities according to predetermined criteria comprising a predetermined relationship between said collected dividend yields and said collected buyback ratios to form a group of ranked securities;

selecting at least some of the ranked securities to form a group of selected securities;

wherein at least one of the steps of collecting, ranking, and selecting is carried out by a computer.

2. The method of claim 1 wherein said group of available securities comprises the 30 stocks that make up the Dow Jones Industrial Average.

3. The method of claim 1 wherein said predetermined criteria consist only of said predetermined relationship between said collected dividend yields and said collected buyback ratios.

4. The method of claim 1 wherein said selecting comprises selecting a predetermined number of said ranked securities.

5. The method of claim 4 wherein said predetermined number is 10 or less.

6. The method of claim 1 wherein said method further includes purchasing at least some of said group of selected securities to form a group of purchased securities.

7. The method of claim 6 wherein said method further includes creating a unit investment trust comprising said purchased securities.

8. The method of claim 7 wherein the percentages of said purchased securities holdings in said unit investment trust are approximately equal.

9. The method of claim 7 wherein said unit investment trust has a life of 13 months or more.

10. The method of claim 6 wherein said method further includes creating a pooled investment vehicle comprising said purchased securities.

11. The method of claim 6 wherein said method further includes creating a variable annuity comprising said purchased securities.

12. The method of claim 6 wherein said method further includes creating an investment account comprising said purchased securities.

13. A computer-readable medium bearing a computer program containing instruction which, when implemented by a general purpose computer, cause the computer to carry out the steps of:

collecting the dividend yield and buyback ratios of said group of available securities;

ranking at least some of the available securities according to predetermined criteria comprising a predetermined relationship between said collected dividend yield and said collected buyback ratios to form a group of ranked securities, the predetermined relationship comprising the magnitude of the sum of said collected dividend yields and said collected buyback ratios; and selecting at least some of the ranked securities having the highest magnitude of the sum of said collected dividend yields and said collected buyback ratios to form a group of selected securities.

14. Apparatus for selecting securities from a group of available securities having dividend yields and buyback ratios for an investment portfolio comprising:

a memory storing the dividend yields and buyback ratios of said group of available securities;

a processor programmed to rank at least some of the available securities according to predetermined criteria comprising a predetermined relationship between said collected dividend yields and said collected buyback ratios to generate a group of ranked securities; and an output unit indicating in human readable form at least said ranked securities.

15. The apparatus of claim 14 wherein said group of available securities comprises the 30 stocks that make up the Dow Jones Industrial Average.

16. The apparatus of claim 1 wherein said predetermined criteria consist only of said predetermined relationship between said collected dividend yields and said collected buyback ratios.

17. The apparatus of claim 14 wherein said processor selects a predetermined number of said ranked securities.

18. The apparatus of claim 17 wherein said predetermined number is 10 or less.

* * * * *

UNITED STATES PATENT AND TRADEMARK OFFICE
CERTIFICATE OF CORRECTION

| | | |
|---|---|---|
| PATENT NO. | : 6,920,432 B1 | |
| APPLICATION NO. | : 09/639478 | |
| DATED | : July 19, 2005 | |
| INVENTOR(S) | : Robert Franklin Carey | |

It is certified that error appears in the above-identified patent and that said Letters Patent is hereby corrected as shown below:

In claim 1, col. 5, line 28, after "method" insert: --,--

In claim 1, col. 5, line 28, after "computer" insert: --,--

In claim 1, col. 5, line 30, after "portfolio" insert: --, the method--

In claim 1, col. 5, line 36, replace ";" with: , the predetermined relationship comprising the magnitude of the sum of said collected dividend yields and said collected buyback ratios; and In claim 1, col. 5, line 37, after "securities" insert: --having the highest magnitude of the sum of said collected dividend yields and said collected buyback ratios--

In claim 13, col. 6, line 26, replace "instruction" with: instructions

In claim 14, col. 6, line 45, after "portfolio" insert: --, the apparatus--

In claim 14 col. 6, line 47, after "securities" insert: --, the predetermined relationship comprising the magnitude of the sum of said collected dividend yields and said collected buyback ratios--

In claim 14, col. 6, line 48, after "least" insert: --some of--

In claim 14, col. 6, line 49, after "securities" insert: --having the highest magnitude of the sum of said dividend yields and said buyback ratios--

In claim 15, col. 6, line 55, after "14" insert: --,--

UNITED STATES PATENT AND TRADEMARK OFFICE
CERTIFICATE OF CORRECTION

PATENT NO. : 6,920,432 B1
APPLICATION NO. : 09/639478
DATED : July 19, 2005
INVENTOR(S) : Robert Franklin Carey It is certified that error appears in the above-identified patent and that said Letters Patent is hereby corrected as shown below:

In claim 16, col. 6, line 58, replace "1" with: 14

Signed and Sealed this

Thirtieth Day of December, 2008

JON W. DUDAS
*Director of the United States Patent and Trademark Office*